United States Patent Office 3,190,423
Patented June 22, 1965

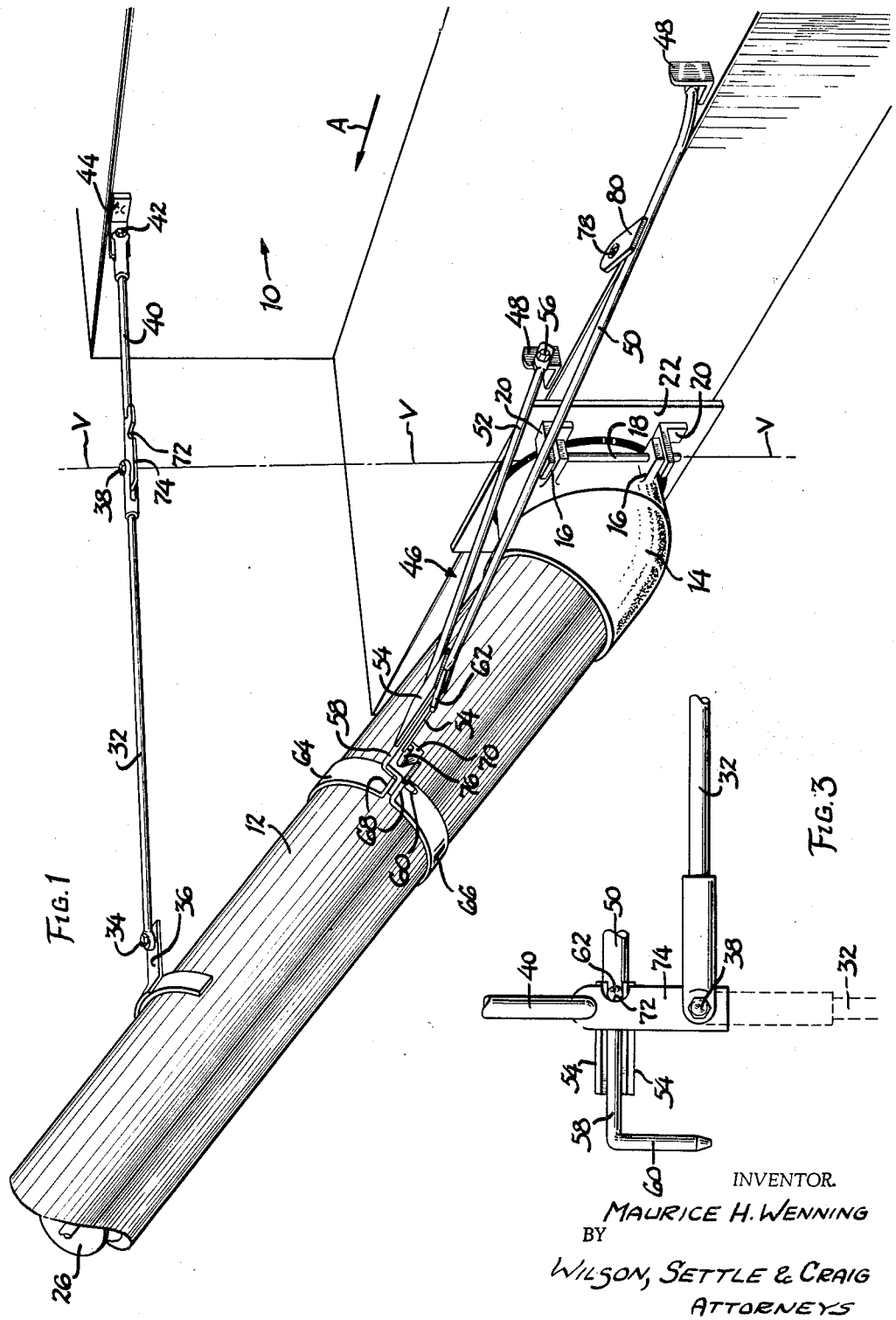

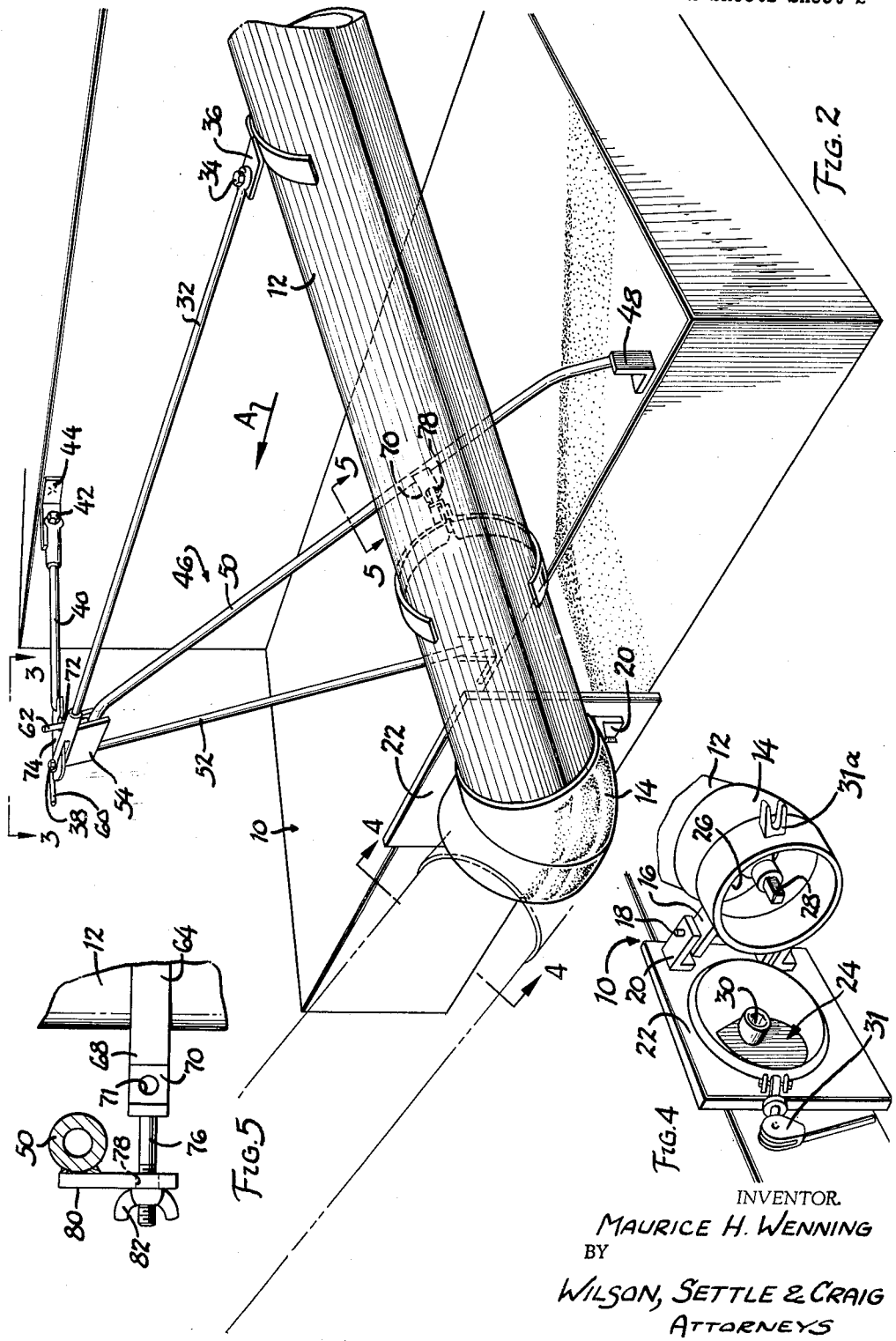

3,190,423
CHUTE SUPPORT FOR COMBINE
Maurice H. Wenning, Moline, Ill., assignor to J. I. Case Company, Racine, Wis., a corporation of Wisconsin
Filed Jan. 16, 1964, Ser. No. 338,126
8 Claims. (Cl. 193—2)

This invention relates to chute supports, and more particularly to support structures for supporting a grain discharge chute upon a combine or similar vehicle in either an operating position or a transport position.

It is one object of the invention to provide a chute support for a combine or the like which is of relatively light weight and efficient construction and which is operable to support and retain a chute in either an operating position or a transport position relative to the combine frame.

It is another object to provide a chute support in accordance with the foregoing object which can be rapidly and easily shifted between one supporting position and the other.

Other objects and features of the invention will become apparent from the following specification and the drawings.

In the drawings:

FIG. 1 is a perspective view of a chute support structure embodying the invention showing portions of a combine frame, with certain parts broken away or omitted, the chute being disposed in its normal operating position;

FIG. 2 is a perspective view of the structure of FIG. 1 showing the chute and support assembly with the chute in its transport position;

FIG. 3 is a detail top plan view of a portion of the chute support assembly in the chute transport position;

FIG. 4 is a perspective detail view of the lower end of the chute assembly with the chute in its transport position; and FIG. 5 is a detail cross sectional view of a portion of the chute support assembly in the transport position.

In the drawings, the invention is disclosed as employed with a discharge chute of the type used in combines to discharge grain, rice, etc. from the combine. Because the invention is directed specifically to the structure employed to support the discharge chute, only portions of the combine frame designated generally 10 have been disclosed in the drawings, the arrow A extending parallel to the front to rear axis of the combine and pointing toward the front. The combine itself may take the form of a combine manufactured and sold by the assignee of this application as Case Model 1010 self-propelled combine.

The particular chute takes the form of an elongate hollow tube 12 which terminates at its lower end in an elbow 14. Chute 12 is vertically inclined and is supported for pivotal movement about a generally vertical axis V (FIG. 1) by projecting lugs 16 fixedly secured on elbow 14 which are coupled by a pivot pin 18 to brackets 20 fixedly mounted upon a plate 22 which in turn is fixedly mounted upon frame 10.

As is apparent from FIGS. 1 and 2, the chute may pivot about axis V between the normal operating position of FIG. 1 in which the chute projects outwardly from the side of the combine and a transport position wherein the chute is inclined toward the rear of the combine and a transport position wherein the chute is inclined toward the rear of the combine, the two positions being displaced approximately 90° about axis V from each other.

Chute 12 is employed to discharge grain or the like from a storage bin (not shown) of the combine from which the grain is conveyed by a screw conveyor designated generally 24 (FIG. 4) through an opening in plate 22. A conveying screw 26 is rotatably mounted within tube 12 and is driven from screw conveyor 24 by means of an angled drive connection which includes a drive shaft 28 of square cross section which is received within a complementary square recess 30 at the end of the shaft of screw conveyor 24 when the chute is in the operating position of FIG. 1. A suitable latch assembly designated generally 31–31a is provided to latch elbow 14 to plate 22 when the chute is in its operating position.

Because of the substantial length and inclination of the chute, it is necessary to provide support for the chute beyond that provided by the pivotal support of its lower ends upon brackets 20. To this end, a support assembly embodying the present invention includes an elongate tension rod 32 which is coupled as at 34 to a bracket 36 fixedly secured to chute 12 at a suitable location on the upper portion of the chute. The opposite end of tension rod 32 is coupled by a pivot 38 to one end of a link 40 which is in turn coupled at its other end as by a pin 42 to a bracket 44 fixedly mounted upon frame 10. Pivot 38 couples tension rod 32 and link 40 to each other for pivotal movement about an axis which is coincident with the axis V about which the chute is pivoted upon frame 10. When the chute is in its normal operating position shown in FIG. 1, tension rod 32 and link 40 are in substantially horizontal longitudinal alignment with each other to act in tension to support the upper end of the chute from combine frame 10.

While tension member 32 and link 40 are capable of withstanding a substantial strain in tension, they exert substantially no resistance to pivotal movement of the chute about the vertical axis V of its mounting upon the frame, especially in view of the pivotal connection between member 32 and link 40 at pivot 38. To maintain the chute against pivotal movement about axis V when in its operating position of FIG. 1, a rigid support arm assembly designated generally 46 is supported upon longitudinally spaced brackets 48 on frame 10 for pivotal movement about a substantially horizontal axis which is perpendicular, or substantially so, to the longitudinal extent of tension member 32 and link 40 when the chute is in the operating position of FIG. 1. The support arm assembly includes a rigid compression arm 50 and a second arm 52 which are fixedly secured, as by welding, at one end to a pair of plates 54, arms 50 and 52 forming a rigid frame of generally V shape with plates 54 located at the apex of the V. The opposite ends of arms 50 and 52 are pivotally mounted on brackets 48, as by pivot pins 56, the pivotal axes established by pins 56 being aligned with each other and extending parallel to the front to rear axis of the combine.

A coupling element 58 of rod stock is fixedly secured, as by welding, between plates 54 and projects beyond the edges of plates. The opposite ends of coupling member 58 are bent at right angles to the central portion of the member, one end 60 being bent in a direction tangential to the pivot axis of pins 56, while the opposite end 62 of the coupling member projects radially outwardly of the axis of pins 56.

A pair of straps 64 and 66 are fixedly secured to the chute and terminate adjacent each other in a pair of radially projecting lugs 68. An angle bracket 70 is secured between lugs 68 as by welding and projects outwardly beyond the ends of the lugs. Beyond the ends of lugs 68, bracket 70 is bored as at 71 (FIG. 5) to receive the projecting end 60 of coupling member 58. The seating of end 60 in the bore through bracket 70 locks the chute against pivotal movement about axis V, since forces exerted by the chute in attempting to pivot about its axis in either direction from the operating position of FIG. 1 are applied via coupling member end 60 to the rigid support arm assembly 46 in direction substantially parallel to the pivotal axis of pivots 56.

To move chute 12 from the operating position of FIG. 1 to the transport position of FIG. 2, support arm assembly 46 is swung upwardly about the axis of pivots 56 to disengage coupling member end 60 from bracket 70. The support arm assembly is pivoted upwardly to the position of FIG. 2 at which time the other end 62 of coupling member 58 is aligned with and seated in a notch 72 formed in a plate 74 which constitutes the outer end of link 40. The chute is then pivoted about its axis V into the position of FIG. 2, the rigid support arm assembly 46 bracing the outer end of link 40 by the engagement between coupling member end 62 and notch 72 in plate 74 so that chute supporting tension is maintained in tension member 32 when the assembly is in the FIG. 2 position.

When the chute is in its transport position, the tension applied to tension member 32 acts on pivot 38 in a direction pulling that end of link 40 toward the rear of the combine. This action is resisted by support arm assembly 46, because coupling member end 62 is located in notch 72 at the rear side of link 40. The weight of the chute thus firmly seats notch 72 on end 62 and link 40 acts through the notch to hold support arm 46 in the FIG. 2 position.

To maintain the chute against pivotal movement from the FIG. 2 position, a threaded stud 76 projects from bracket 70 to pass through a bore 78 in a plate 80 welded to arm 50 of assembly 46. When the chute is in the transport position of FIG. 2, stud 76 projects through bore 78 beyond the opposite side of plate 80 and a wing nut 82 is threaded onto the projecting portion of stud 76 to lock the chute to support arm assembly 46 which in turn is held in the FIG. 2 position by the engagement of coupling member end 62 in notch 72 of link 40.

While one embodiment of the invention has been described in detail, it will be apparent to those skilled in the art that the disclosed embodiment may be modified. Therefore, the foregoing description is to be considered exemplary rather than limiting, and the true scope of the invention is that defined in the following claims.

I claim:

1. In a combine or the like having a frame, and an elongate upwardly inclined discharge chute mounted at its lower end on said frame for pivotal movement about a generally vertical axis between an outwardly projecting operating position and a transport position adjacent one side of said frame displaced approximately 90° about said axis from said operating position; elongate tension means coupled at one end to said chute adjacent the upper end thereof, a link coupled at one end to said frame and coupled at its other end to the other end tension means, said link and said tension means being in longitudinal tensioning alignment with each other when said chute is in said operating position to support the upper end of said chute from said frame, support arm means mounted at one end on said frame for pivotal movement between a first position and a second position, a coupling assembly mounted on the other end of said support arm means, first coupling means on said chute engageable with said coupling assembly when said support arm means is in said first position to lock said chute against pivotal movement from its operating position, and second coupling means on said link adjacent said other end of said link engageable with said coupling assembly when said support arm means is in said second position to maintain tension in said tensioning means when said chute is in said transport position.

2. Apparatus as defined in claim 1 wherein said support arm means comprises a pair of arms fixedly secured at one end to said coupling assembly and diverging from said coupling assembly to define a rigid generally V shaped frame with the coupling assembly located at the apex of the V, and means pivotally mounting the other ends of said arms upon said frame for pivotal movement about a common substantially horizontal axis generally parallel to said one side of said frame.

3. In a combine or the like having a frame, and an elongate upwardly inclined discharge chute mounted at its lower end on said frame at one side thereof for pivotal movement about a generally vertical axis between an operating position and a transport position displaced approximately 90° about said axis from said operating position; elongate tension means coupled at one end to said chute adjacent the upper end thereof, a link coupled at one end to said frame and pivotally coupled at its other end to the other end tension means, said link and said tension means being in longitudinal tensioning alignment with each other when said chute is in said operating position to support the upper end of said chute from said frame, support arm means mounted at one end on said frame for pivotal movement between a first position and a second position, a first coupling assembly mounted on the other end of said support arm means, a second coupling assembly on said chute engageable with said first coupling assembly when said support arm means is in said first position to lock said chute against pivotal movement from its operating position, and first coupling means on said link adjacent said other end of said link engageable with said first coupling assembly to maintain said support arm means in said second position and to maintain tension in said tensioning means when said chute is in said transport position, and second coupling means on said support arm means engageable with said second coupling assembly when said support arm means is in said second position to lock said chute against pivotal movement from its transport position.

4. Apparatus as defined in claim 3 wherein said support arm means comprises a pair of arms fixedly secured at one end to said first coupling assembly and diverging from said coupling assembly to define a rigid generally V shaped frame with said coupling assembly at the apex of the V, and means mounting the other ends of said arms on said frame for pivotal movement about a common generally horizontal axis, said second coupling means being located on one of said arms intermediate the ends thereof.

5. In a combine or the like having a frame, and an elongate upwardly inclined discharge chute mounted at its lower end on said frame for pivotal movement about a generally vertical axis between an operating position projecting outwardly from one side of the combine and a rearwardly inclined transport position displaced approximately 90° about said axis from said operating position; elongate tension means coupled at one end to said chute adjacent the upper end thereof, an elongated link coupled at one end to said frame, pivot means coupling the other end of said tension member to the other end of said link for pivotal movement about an axis substantially coincident with the pivotal axis of said chute, said link and said tension means being in substantially horizontal longitudinal tensioning alignment with each other when said chute is in said operating position to support the upper end of said chute from said frame, support arm means mounted at one end on spaced points on said frame for pivotal movement between a first position and a second position about a substantially horizontal axis parallel to said one side of the combine, a coupling assembly mounted on the other end of said support arm means, first coupling means on said chute engageable with said coupling assembly when said support arm means is in said first position to lock said chute against pivotal movement from its operating position, and second coupling means on said link adjacent said other end of said link engageable with said coupling assembly when said support arm means is in said second position to maintain tension in said tensioning means when said chute is in said transport position.

6. Apparatus as defined in claim 5 wherein said tentioning means is displaced substantially 90° about the axis of said pivot means from longitudinal alignment with said link and extends longitudinally in substantially parallel relationship to the horizontal axis of said support arm means when said chute is in said transport position, said second coupling means comprising a plate having a rearwardly opening notch therein and said coupling assembly having a projecting member seated in said notch when said support arm means is in said second position to brace said other end of said link against rearward movement.

7. In a combine or the like having a frame, and an elongate upwardly inclined discharge chute mounted at its lower end on said frame at one side thereof for pivotal movement about a generally vertical axis between an operating position wherein said chute projects outwardly from said one side of said frame and a rearwardly inclined transport position displaced approximately 90° about said axis from said operating position wherein said chute lies along said one side of said frame; elongate tension means coupled at one end to said chute adjacent the upper end thereof, a link coupled at one end to said frame, means pivotally coupling the other end of said tension means to the other end of said link for pivotal movement about an axis coincident with said generally vertical axis, said link and said tension means being in longitudinal tensioning alignment with each other when said chute is in said operating position to support the upper end of said chute from said frame, support arm means mounted at one end at spaced points on said frame for pivotal movement between a first position and a second position about an axis parallel to said one side of the combine, a coupling assembly mounted on the other end of said support arm means, first coupling means on said chute engageable with said coupling assembly when said support arm means is in said first position to lock said chute against pivotal movement from its operating position, second coupling means on said link adjacent said other end of said link engageable with said coupling assembly when said support arm means is in said second position to maintain chute supporting tension in said tensioning means when said chute is in said transport position, and means for coupling said chute to said support arm means when said support arm means is in said second position to maintain said chute against pivotal movement from its transport position.

8. Apparatus as defined in claim 7 wherein said second coupling means on said link comprises a rigid plate having a rearwardly opening notch therein adapted to receive a portion of said coupling assembly to enable said support arm means to brace said one end of said link against rearward movement, the tension in said tensioning means urging said plate rearwardly against said portion of said coupling assembly to lock said support arm means against pivotal movement from said second position.

References Cited by the Examiner
UNITED STATES PATENTS

| | | | |
|---|---|---|---|
| 1,147,884 | 7/15 | Ormsby | 193—2 |
| 3,169,620 | 2/65 | Patz | 193—2 |

SAMUEL F. COLEMAN, *Primary Examiner.*

UNITED STATES PATENT OFFICE
CERTIFICATE OF CORRECTION

Patent No. 3,190,423

June 22, 1965

Maurice H. Wenning

It is hereby certified that error appears in the above numbered patent requiring correction and that the said Letters Patent should read as corrected below.

Column 4, line 7, for "above" read -- about --; line 52, for "elongated" read -- elongate --.

Signed and sealed this 7th day of December 1965.

(SEAL)
Attest:

ERNEST W. SWIDER
Attesting Officer

EDWARD J. BRENNER
Commissioner of Patents